(12) United States Patent
Kamran et al.

(10) Patent No.: US 10,996,882 B2
(45) Date of Patent: May 4, 2021

(54) FITTEST STRIPE SELECTION FOR STORAGE OF DATA IN STORAGE SYSTEMS

(71) Applicant: EMC IP Holding Company LLC, Hopkinton, MA (US)

(72) Inventors: Lior Kamran, Rishon LeZion (IL); Alex Soukhman, Raanana (IL); Marcelo Taube, Tel Aviv (IL); Ronen Gazit, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 33 days.

(21) Appl. No.: 16/260,480

(22) Filed: Jan. 29, 2019

(65) Prior Publication Data

US 2020/0241785 A1    Jul. 30, 2020

(51) Int. Cl.
*G06F 3/06* (2006.01)

(52) U.S. Cl.
CPC .......... *G06F 3/0644* (2013.01); *G06F 3/0604* (2013.01); *G06F 3/0659* (2013.01); *G06F 3/0689* (2013.01)

(58) Field of Classification Search
CPC .... G06F 3/0604; G06F 3/0644; G06F 3/0659; G06F 3/0689
See application file for complete search history.

(56) References Cited

U.S. PATENT DOCUMENTS 10,365,827 B1 * 7/2019 Satish ................... G06F 3/0631

* cited by examiner

*Primary Examiner* — Idriss N Alrobaye
*Assistant Examiner* — Richard B Franklin
(74) *Attorney, Agent, or Firm* — Daly, Crowley Mofford & Durkee, LLP

(57) ABSTRACT

A method for storing data in a storage system is provided, the method including: receiving a request to store data in a RAID volume of the storage system; selecting a stripe block size that is supported by the RAID volume, the RAID volume including a plurality of stripes that are formed of blocks having the selected stripe block size; and identifying a given one of the plurality of stripes that includes enough free space to accommodate the data and storing the data in the given stripe, the given stripe including a smaller amount of free space than at least some of the stripes in the plurality that have sufficient free space to accommodate the data.

18 Claims, 10 Drawing Sheets

FITTEST STRIPE SELECTION FOR STORAGE OF DATA IN STORAGE SYSTEMS

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is provided for storing data in a storage system, the method comprising: receiving a request to store data in a RAID volume of the storage system; selecting a stripe block size that is supported by the RAID volume, the RAID volume including a plurality of stripes that are formed of blocks having the selected stripe block size; and identifying a given one of the plurality of stripes that includes enough free space to accommodate the data and storing the data in the given stripe, the given stripe including a smaller amount of free space than at least some of the stripes in the plurality that have sufficient free space to accommodate the data.

According to aspects of the disclosure, a system is disclosed comprising: a memory; and at least one or processor operatively coupled to the memory, the at least one processor being configured to: receive a request to store data in a RAID volume of the storage system; select a stripe block size that is supported by the RAID volume, the RAID volume including a plurality of stripes that are formed of blocks having the selected stripe block size; and identify a given one of the plurality of stripes that includes enough free space to accommodate the data and storing the data in the given stripe, the given stripe including a smaller amount of free space than at least some of the stripes in the plurality that have sufficient free space to accommodate the data.

According to aspects of the disclosure, a non-transitory computer-readable medium is provided that stores one or more processor-executable instructions which, when executed by at least one processor, cause the at least one processor to perform the operations of: receiving a request to store data in a RAID volume of the storage system; selecting a stripe block size that is supported by the RAID volume, the RAID volume including a plurality of stripes that are formed of blocks having the selected stripe block size; and identifying a given one of the plurality of stripes that includes enough free space to accommodate the data and storing the data in the given stripe, the given stripe including a smaller amount of free space than at least some of the stripes in the plurality that have sufficient free space to accommodate the data.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

DETAILED DESCRIPTION

Figure 1:
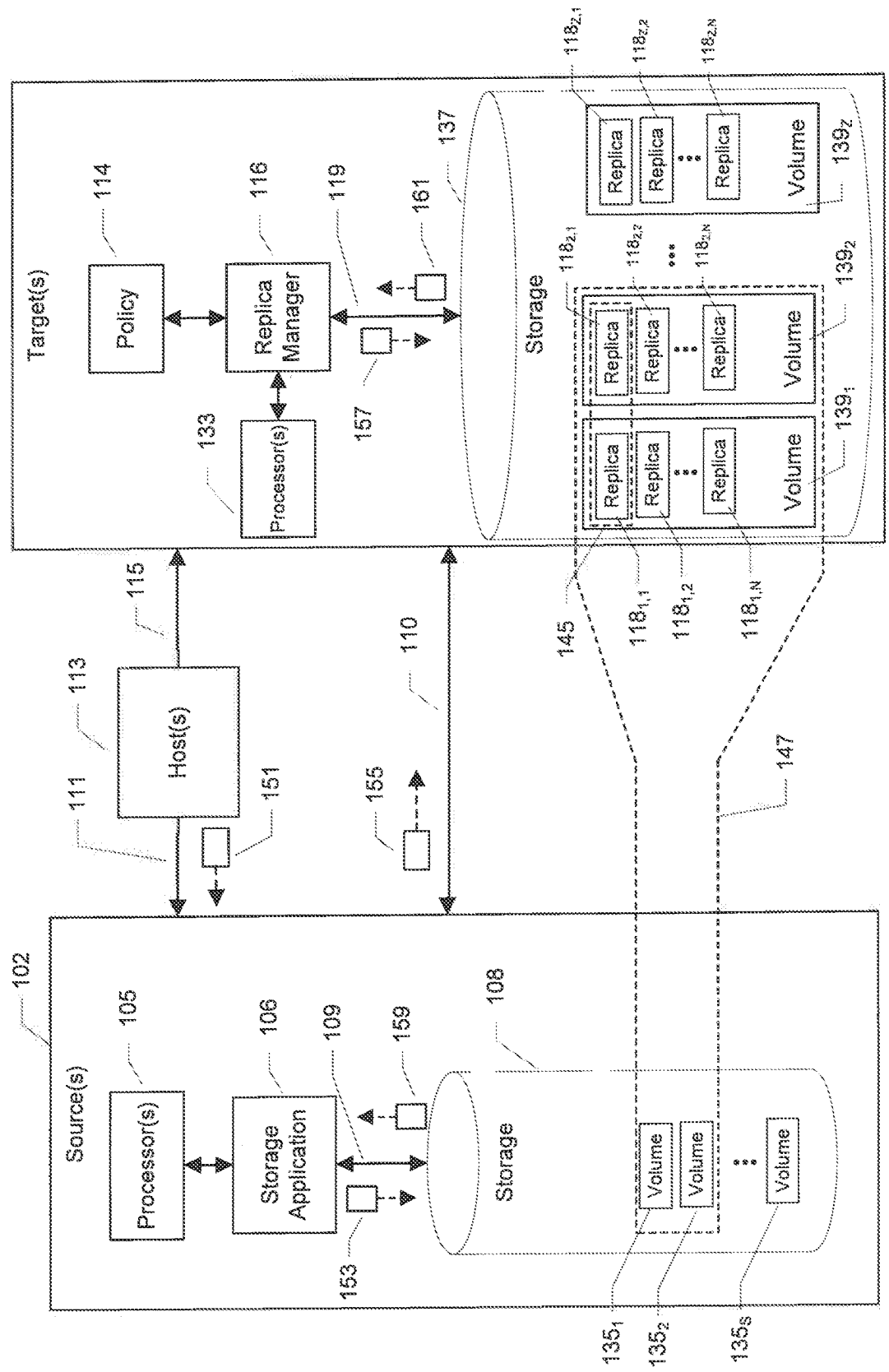
FIG. 1 is a block diagram of an example of a storage system, according to aspects of the disclosure.

FIG. 1 shows an example storage system 100, in accordance with illustrative embodiments. Storage system 100 may include at least one source site 102 and at least one target site 112, which may be co-located or geographically separated. Source site 102 may include one or more processors 105, storage application 106, and storage 108. In some embodiments, storage 108 may include one or more storage volumes $135_{1-S}$, that operate as active or production volumes. Source site 102 and target site 112 may be in communication with one or more hosts 113 via communication links 111 and 115, respectively.

Hosts 113 may perform input/output (I/O) operations on source-side storage 108 (e.g., read data from and write data to storage 108). In some embodiments, the I/O operations may be intercepted by and controlled by storage application 106. As changes are made to data stored on storage 108 via the I/O operations from hosts 113, or over time as storage system 100 operates, storage application 106 may perform operations to replicate data from source site 102 to target site 112 over communication link 110. In some embodiments, communication link 110 may be a long distance communication link of a storage area network (SAN), such as an Ethernet or Internet (e.g., TCP/IP) link that may employ, for example, the iSCSI protocol. In some embodiments, one or both of source site 102 and/or target site 112 may include one or more internal (e.g., short distance) communication links (shown as communication links 109 and 119), such as an InfiniBand (113) link or Fibre Channel (FC) link. Communication link 109 may be employed to transfer data between storage volumes $1351_{1-s}$ of storage 108 and one or both of storage application 106 and processor(s) 105. Communication link 119 may be employed to transfer data between storage volumes $139_{1-z}$ of storage 137 and one or both of replica manager 116 and processor(s) 133.

In illustrative embodiments, target site 112 may include replica manager 116 that manages a plurality of replicas $118_{1-N}$ according to a policy 114 (e.g., a replication and/or retention policy). Replicas 118 may be stored in one or more volumes $139_{1-z}$ of storage 137 of target site 112. A replica (or snapshot) may be created from data within storage 108 and transferred to one or more target sites 112 during a data replication cycle that may be performed based on data replication policies (e.g., policy 114) that may define various settings for data recovery operations. A data replication cycle may be asynchronous data replication performed at time-based intervals during operation of storage system 100, or may alternatively be synchronous data replication performed when data is changed on source site 102.

In illustrative embodiments, storage system 100 may include one or more consistency groups. A consistency group 147 may include one or more volumes 135 of source site 102, each associated with a corresponding volume 139 of target site 112. Consistency group 147 may treat source volumes 135 and target volumes 139 as a single logical entity for data replication and migration. Each volume 139 may store one or more associated replicas 118 that reflect the data in the consistency group 147 at a point in time (e.g., when the replica 118 was created). For example, replicas (e.g., snapshots) 118 may be generated for each source volume 135 of consistency group 147 at the same time, and stored on associated ones of target volumes 139. As shown in FIG. 1, an illustrative consistency group 147 may include two source volumes 1351 and 1352 and two target volumes $139_1$ and 1392. Each of target volumes $139_1$ and 1392 may include one or more replicas 118. In some embodiments, replicas 118 for respective source volumes 135 of consistency group 147 may be grouped into sets (e.g., a snapshot set or snapset 145).

Figure 2:
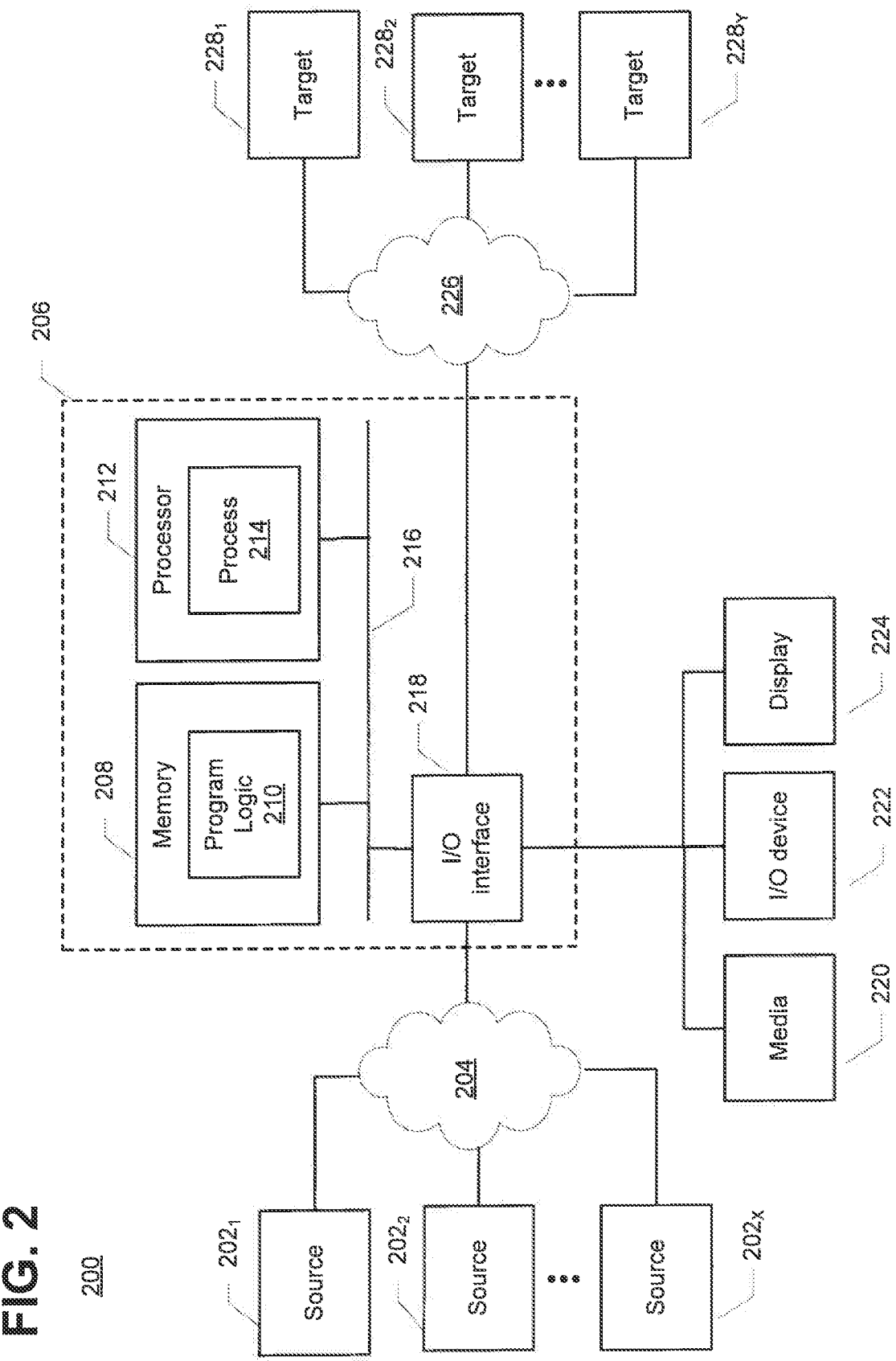
FIG. 2 is a block diagram of another example of a storage system, according to aspects of the disclosure.

Referring to FIG. 2, in an illustrative embodiment, apparatus 206 may form part of system 200 and include memory 208 storing program logic 210, processor 212 for executing process 214, and communications I/O interface 218, connected via a bus 216 to allow communication between memory 208, processor 212 and devices external to apparatus 206. For example, in some embodiments, communications I/O interface 218 may be coupled to apparatus 206, external media 220, one or more I/O devices 222, and a display device 224. In some embodiments, communications I/O interface 218 may couple apparatus 206 to one or more source devices $202_1$-$202_x$ via network 204. In some embodiments, communications 110 interface 218 may couple apparatus 206 to one or more target devices $228_1$-$228_Y$ via network 226. In some embodiments, network 226 of FIG. 2 may be a communication fabric between volumes of targets 228. For example, in some embodiments, network 226 may be an InfiniBand (IB) network or a Fibre Channel (FC) network.

Referring back to FIG. 1, in some embodiments, one of hosts 113 may send an I/O request (e.g., I/O request 151) to perform an I/O operation on storage 108 of source site 102. For example, I/O request 151 may be a request to read an associated amount of data from storage 108, or may be a request to write an associated amount of data to storage 108. In some embodiments, I/O request 151 may include one or more data packets. When I/O request 151 is a write request, processor(s) 105 and/or storage application 106 may then perform one or more corresponding write operations (e.g., write operation 153) to write payload data associated with the one or more data packets (e.g., one or more payload data segments) of I/O request 151 to storage 108. When I/O request 151 is a read request, processor(s) 105 and/or storage application 106 may then read data from storage 108 in one or more packets (e.g., one or more read operations 159) to process I/O request 151 from storage 108.

In illustrative embodiments, source site 102 may send a replica (e.g., replica 155) to target site 112. Processor(s) 133 and/or replica manager 116 may then perform one or more corresponding write operations (e.g., write operation 157) to write payload data (e.g., one or more payload data segments) associated with the one or more data packets of replica 155 to storage 137. Similarly, replica manager 161 may read replica data from storage 137 by one or more read operations 161. In some embodiments, data packet 310 may be a data packet formatted in accordance with the TCP/IP and iSCSI protocols.

Figure 3:
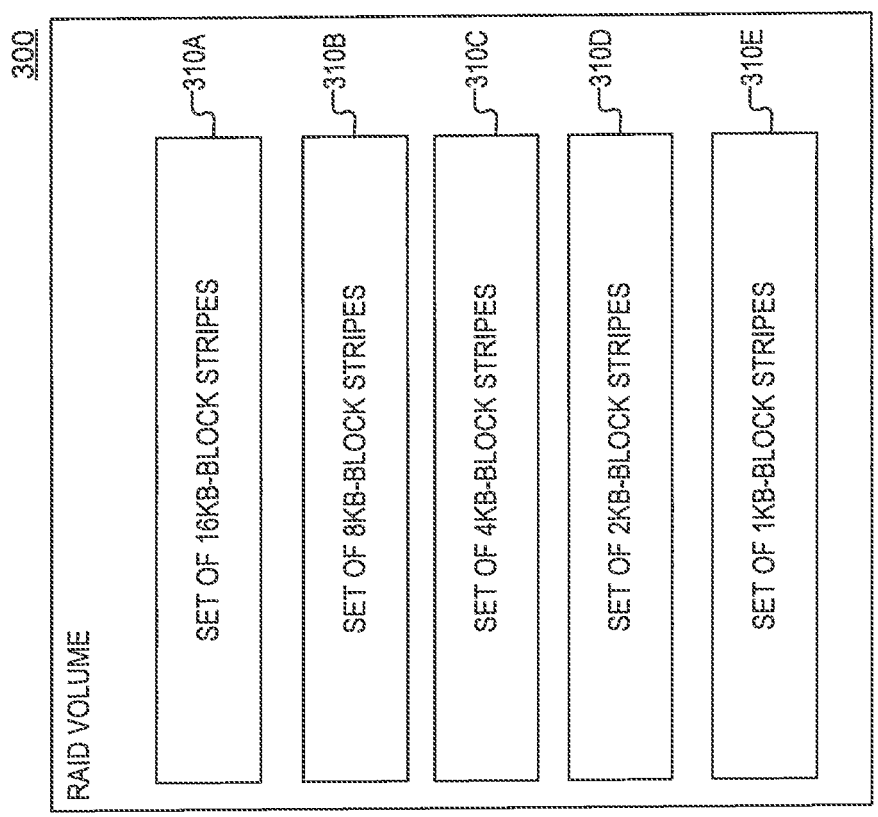
FIG. 3 is a diagram of an example of a RAID volume, according to aspects of the disclosure.

FIG. 3 is a diagram of an example of a Redundant Array of Independent Discs (RAID) volume 300, according to aspects the disclosure. The RAID volume may be part of any of the storage systems 100 and 200. The RAID volume 300 may be implemented using a plurality of storage devices (e.g, SSD drives) arranged in a RAID configuration. As illustrated, the RAID volume 300 may include stripe sets 310A-E. Each of the stripe sets 310A-E contains stripes that are formed of blocks having the same size. For example, the set 310A may include one or more stripes that are formed of blocks that are 16 KB each; the set 310B may include one or more stripes that are formed of blocks that are 8 KB each; the set 310C may include one or more stripes that are formed of blocks that are 4 KB each; the set 310D may include one or more stripes that are formed of blocks that are 2 KB each; and the set 310E may be formed of stripes that are 1 KB each. Although in the present example, the sizes of the blocks are different powers of 2, it will be understood that the present disclosure is not limited to any specific block size. In this regard, in some implementations, the system may include stripes that are formed of blocks that are 1 KB each, 3 KB each, and/or any other suitable size.

Figure 4:
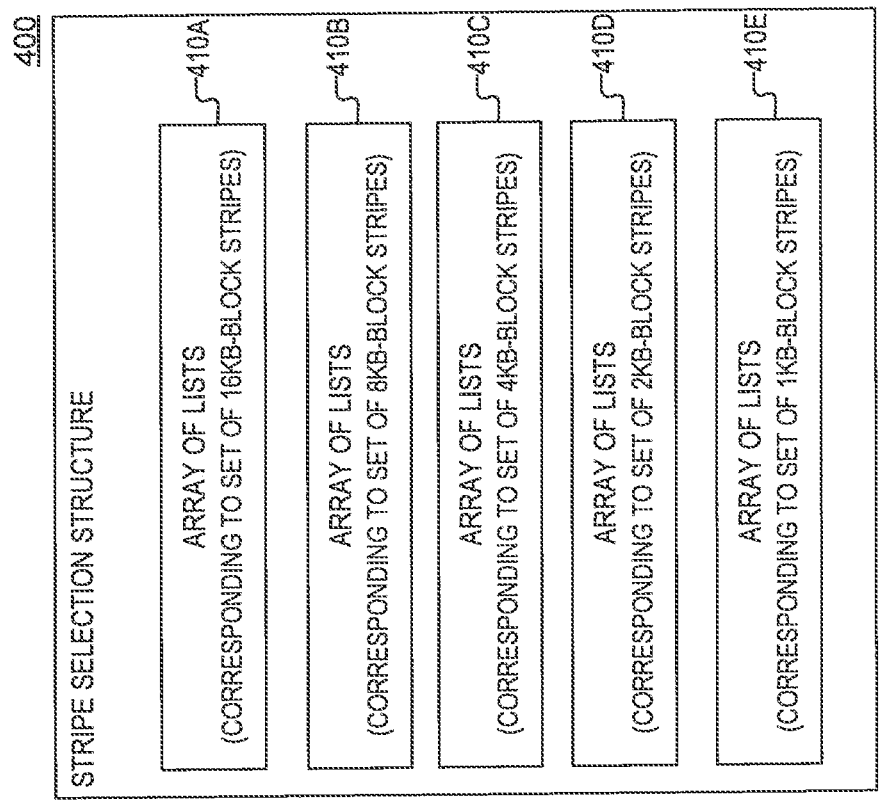
FIG. 4 is a diagram of an example of a stripe selection structure, according to aspects of the disclosure.

FIG. 4 is a diagram of an example of a stripe selection structure 400 that is associated with the RAID volume 300, according to aspects of the disclosure. The stripe selection structure 400 may be used to select stripes in volume 300 to receive data when an instruction to store the data in volume 300 is received at a node in the storage system 100/200. The stripe selection structure may include a plurality of arrays of lists 410A-E. Each of the arrays 410 may include identifiers for stripes that are the same type. For example, the array 410A may include only identifiers for stripes that are formed of 16 KB blocks; the array 410B may include only identifiers for stripes that are formed of 8 KB blocks; the array 410C may include only identifiers for stripes that are formed of 4 KB blocks; the array 410D may include only identifiers for stripes that are formed of 2 KB blocks; and the array 410E may include identifiers that are formed of 1 KB blocks.

Although in the example of FIG. 4, the arrays 410 are encapsulated in the same data structure, alternative implementations are possible in which the arrays 410 are stored independently of one another. Although in the present example, each of the arrays 410 includes only identifiers for stripes that are the same type (i.e., stripes that are formed of blocks having the same size), alternative implementations are possible in which at least one of the arrays includes identifiers corresponding to stripes of different types (i.e., stripes that are formed of differently-sized blocks). As used throughout the present disclosure, the term "list" means either "an empty set" or "a set of one or more items." Furthermore, it will be understood that the use of the term "list" in no way implies the use of a particular data structure to store stripe identifiers. The lists of stripe identifiers that are discussed throughout the disclosure may be implemented by using any suitable type of data structure, such as a stack or a numerical array (e.g., an integer array), for example. As used throughout the disclosure, the phrase "stripe type" may refer to the block size of the stripe. Under this nomenclature, stripes having the same type are formed of blocks that are the same size, while different types of stripes are formed of blocks having different sizes. As used throughout the disclosure, the term "stripe" may refer to any of suitable type of storage unit, including, but not limited to, RAID stripes. Although the examples provided herein are discussed in the context of RAID and RAID stripes, it will be understood that the present disclosure is not limited to any specific type of storage technology.

Figure 5:
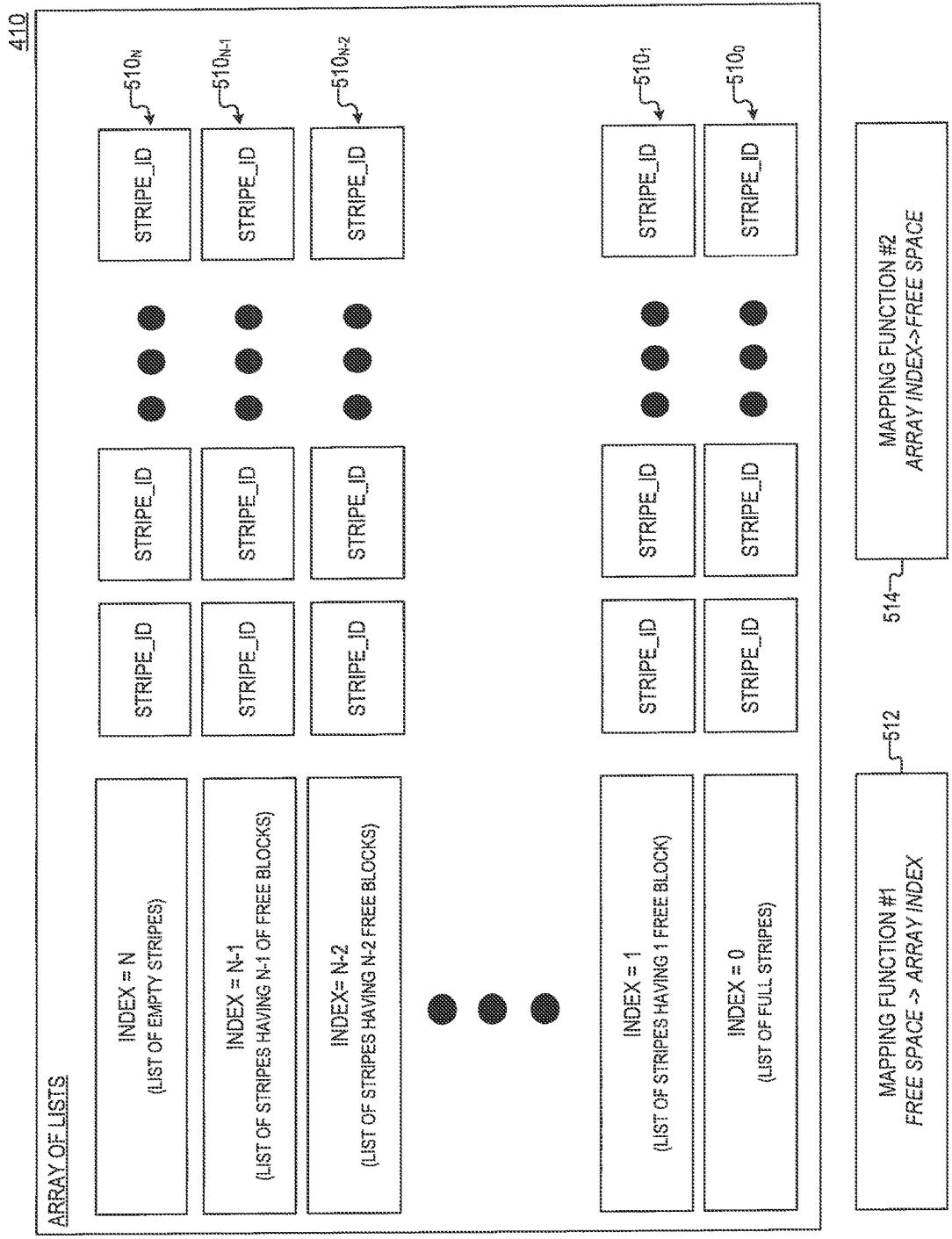
FIG. 5 is a diagram of an example of an array of lists, according to aspects of the disclosure.

FIG. 5 is a diagram of an array 410, according to aspects of the disclosure. As the numbering the suggests, the array 410 is representative of any of the arrays 410A-E. As such, the array 410 may include identifiers of stripes that are from the same type (i.e., stripes that are formed of blocks having the same size). The identifiers may be organized in lists $510_{0-N}$, where N is an integer. The identifiers in any given one of the lists may correspond to stripes that have matching amounts of free space. For example, in some implementations, each list 510 may include identifiers for stripes that have exactly the same amount of free space. In such implementations, one of the lists 510 may include only identifiers for stripes having 1 MB of free space, another one of the lists 510 may include only identifiers for stripes having 2 MB of free space, another one of the lists 510 may include identifiers for stripes having 3 MB of free space, and so forth. As another example, in some implementations, each list may include identifiers of stripes whose free space falls within a predetermined range. In such implementations, one of the lists 510 may include only identifiers for stripes in which the amount of free space ranges between 1 MB and 3 MB, another one of the lists 510 may include only identifiers for stripes in which the amount of free space ranges between 3 MB and 5 MB, another one of the lists 510 may include identifiers for stripes in which the amount of free space ranges between 5 MB and 7 MB, and so forth.

The array index of each list 510 may encode the amount of free space that is available in the stripes identified in the list. In this regard, the array 410 may be provided with a first mapping function 512 and a second mapping function 514. The first mapping function 512 may map the amount of free space available in the stripes identified by any given one of the lists 510 to the index, in the array 410, at which the list is located. The second mapping function 514 may map a given index in the array 410 to the amount of free space available in the stripes identified in the list 510 that is located at the given index. As is further discussed below, when data is desired to be stored in volume 300, the first mapping function 512 may be used to determine the list 510 which identifies stripes that have sufficient free space to store the data. The second mapping function 514 may be used in instances when additional data is stored in a stripe, and the amount of free space in that stripe is decreased as a result. In such instances, the second mapping function 514 may be used to calculate the index of a new list 510 that identifies stripes containing the same (or similar) amount of free space as the given stripe (after the storage operation is performed) and store an identifier corresponding to the stripe in the new list 510.

According to the present example, the stripe identifiers are arranged in the lists 510 based on the count of free blocks available in the stripes. More particularly, according to the present example, each of the lists 510 includes only identifiers for stripes that have the same count of free blocks. For example, one of the lists 510 may include identifiers of all stripes in volume 300, from a given type (i.e., stripes that are formed of 16 KB blocks), that each have a total of 3 free blocks, another one of the lists 510 may include the identifiers for all stripes in volume 300, from the given type, that each have a total of 4 free blocks, another one of the lists 510 may include the identifiers for all stripes in volume 300, from the given type, that each have a total of 5 free blocks, and so forth.

According to the present example, the first mapping function 512 may be f(FB)=FB, where FB is a count of all free blocks that are available in the stripe and f(FB) is the index of the list 510, in the array 410, where stripes having FB free blocks are identified. Similarly, the second mapping function may be g(I)=I, where 1 is an index in the array 410 and g(I) is the total count of free blocks that are available in each (or at least some) of the stripes identified in the list 510 that is situated at index 1 in the array 410. Under this arrangement, the index of each of the lists 510 is equal to the count of free blocks available in the stripes identified by the list. For example, the list 510 that is situated at index 1 in the array 410 may include only identifiers corresponding to stripes having a total of 1 free block each, the list 510 that is situated at index 2 in the array 410 may include only identifiers corresponding to stripes having a total of 2 free blocks each, the list 510 that is situated at index 3 in the array 410 may include only identifiers corresponding to stripes having a total of 3 free blocks each, and so forth.

According to the present example, the array 410 includes N lists 510, wherein N is equal to the total count of blocks in any of the stripes. Under this arrangement, the list located at index 0 in the array 410 may include identifiers corresponding to stripes that are full and the index located at index N may include identifiers corresponding to stripes that are empty. Furthermore, in some instances, at least some of the lists 510 may be empty lists. For example, if no stripe (of a particular type) in volume 300 has 15 free blocks, the list 510 that is located at index 15 in the array 410 may be an empty list. According to aspects of the disclosure, because the index of each of the lists 510 corresponds to the amount of free space available in the stripes identified in the list (if any), the array 410 can be used to efficiently identify stripes in volume 300 that have a desired amount of free space, and store data in the identified stripes. The manner in which the array 410 can be used store data in volume 300 is discussed further below with respect to FIG. 6.

Figure 6:
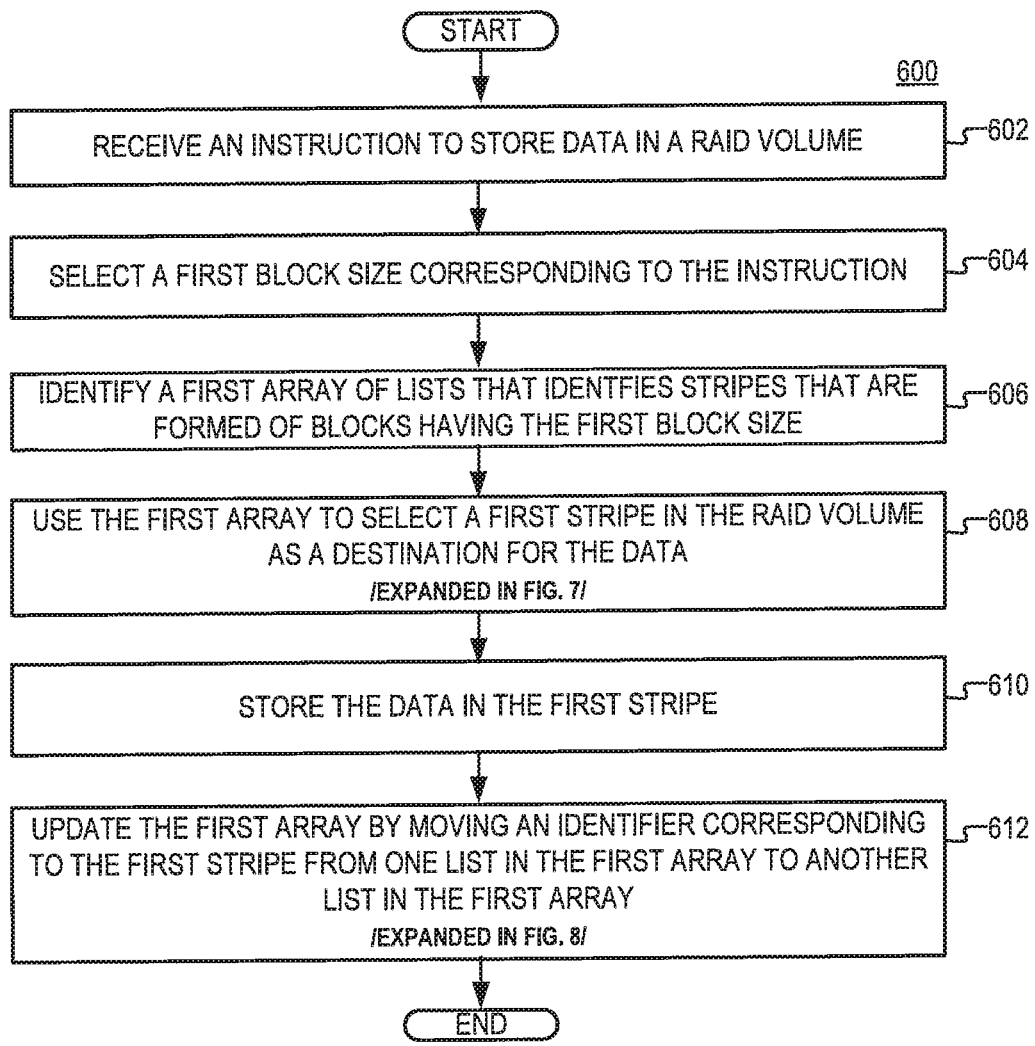
FIG. 6 is a flowchart of an example of a process, according to aspects of the disclosure.

FIG. 6 is a flowchart of an example of a process 600 for storing data in a RAID volume, according to aspects of the disclosure. In some implementations, the process 600 may be executed by a node in a storage system. The node may include any computing device that is part of the storage system or one or more processes that are at least in part executed by the computing device. The storage system may be the same or similar to any of the storage systems 100 and 200.

At step 602, an instruction to store data in a RAID volume is received at a node in the storage system. In some implementations, the RAID volume may be the same or similar to volume 300, which is discussed above with respect to FIG. 3. In some implementations, the instruction may be received from a host device that is external to the storage system. Additionally or alternatively, the instruction may be received from another node in the storage system, and it may be generated based on an instruction that is received at the storage system from a host device. Stated succinctly, the present disclosure is not limited to any specific type of instruction being received.

At step 604, a first block size corresponding to the instruction is selected. In some implementations, selecting the first block size may include selecting the type of stripe where the data associated with the instruction is going to be stored. For example, selecting the first block size may include determining that the data associated with the instruction is required to be stored in a stripe that is formed of 16 KB blocks. As another example, selecting the first block size may include determining that the data associated with the instruction is required to be stored in a stripe that is formed of 8 KB blocks. In some implementations, the first block size may be selected based on the type of data associated with the instruction. For instance, the first block size may be selected based on the compression level of the data.

At step 606, a first array of lists is selected that corresponds to the first block size. In some implementations, the selected array may include identifiers corresponding stripes that are formed of blocks having the first block size. For instance, if at step 604 it is determined that the data is required to be stored in a stripe formed of 16 KB blocks, a first array may be selected that includes identifies for stripes that are formed of 16 KB blocks. Similarly, if at step 604 it is determined that the data is required to be stored in a stripe formed of 8 KB stripes, a first array may be selected that includes identifies for stripes that are formed of 8 KB blocks.

In some implementations, the first array of lists may have the same structure as the array 410, which is discussed above with respect to FIG. 4. As such, the first array may include identifiers for the same type of stripes (e.g., stripes that have the same block size). The identifiers for the stripes may be arranged in lists, such that the index of each list encodes the amount of free space that is available in stripes identified by the list. The first array of lists may be associated with a first mapping function, which is the same or similar to the function 512, and which maps the amount of free space available in the stripes identified by any given one of the lists 510 to the index, in the first array, which is assigned to the list. The first array of lists may also be associated with a second mapping function, which is the same or similar to the function 514, and which maps any given index in the first array to the amount of free space available in the stripes identified in the list that is located at the given index.

At step 608, a first stripe is selected based on the first array of lists. The first stripe is formed of blocks having the first block size. The first stripe is selected in accordance with a selection criterion. In some implementations, the selection criterion may be configured to choose a partially-filled stripe over any empty stripes identified by the first array, when at least one partially-filled stripe (having the first block size) is available that has sufficient free space to accept the data associated with the instruction. Additionally or alternatively, in some implementations, the selection criterion may be configured to choose the fullest stripe, that is identified by the first array, which has sufficient capacity to accept the data associated with the instruction. Additionally or alternatively, in some implementations, the selection criterion may include any suitable selection criterion which when applied causes suitable non-empty stripes (i.e., stripes that have sufficient amount of free space to receive data) to be filled before stripes that are empty. Additionally or alternatively, in some implementations, the selection criterion may be any criterion which when applied causes at least one of the stripes identified by the first array to remain empty. For reasons discussed further below with respect to FIG. 9, facilitating the presence of empty stripes is advantageous because it can help improve the efficiency of defragmentation processes that are tasked with ensuring that the storage system maintains a sufficient storage capacity in each stripe type. In some implementations, step 608 may be executed as discussed further below with respect to FIG. 7.

At step 610, the data associated with the instruction is stored in the first stripe.

At step 612, the first array of lists is updated by moving the identifier corresponding to the first stripe from one list to another. As noted above, each list in the first array may include identifiers that have a matching amount of free space (e.g., the same number of free blocks). After the data is stored in the first stripe, the amount of free space (e.g., the number of free blocks) that is available in the stripe is decreased. This decrease necessitates moving the identifier from a list corresponding to the amount of free space available in the first stripe before the data is stored to another list which corresponds to the available free space that remains in the stripe after the data is stored. The manner in which step 612 is performed is discussed further below with respect to FIG. 8.

Figure 7:
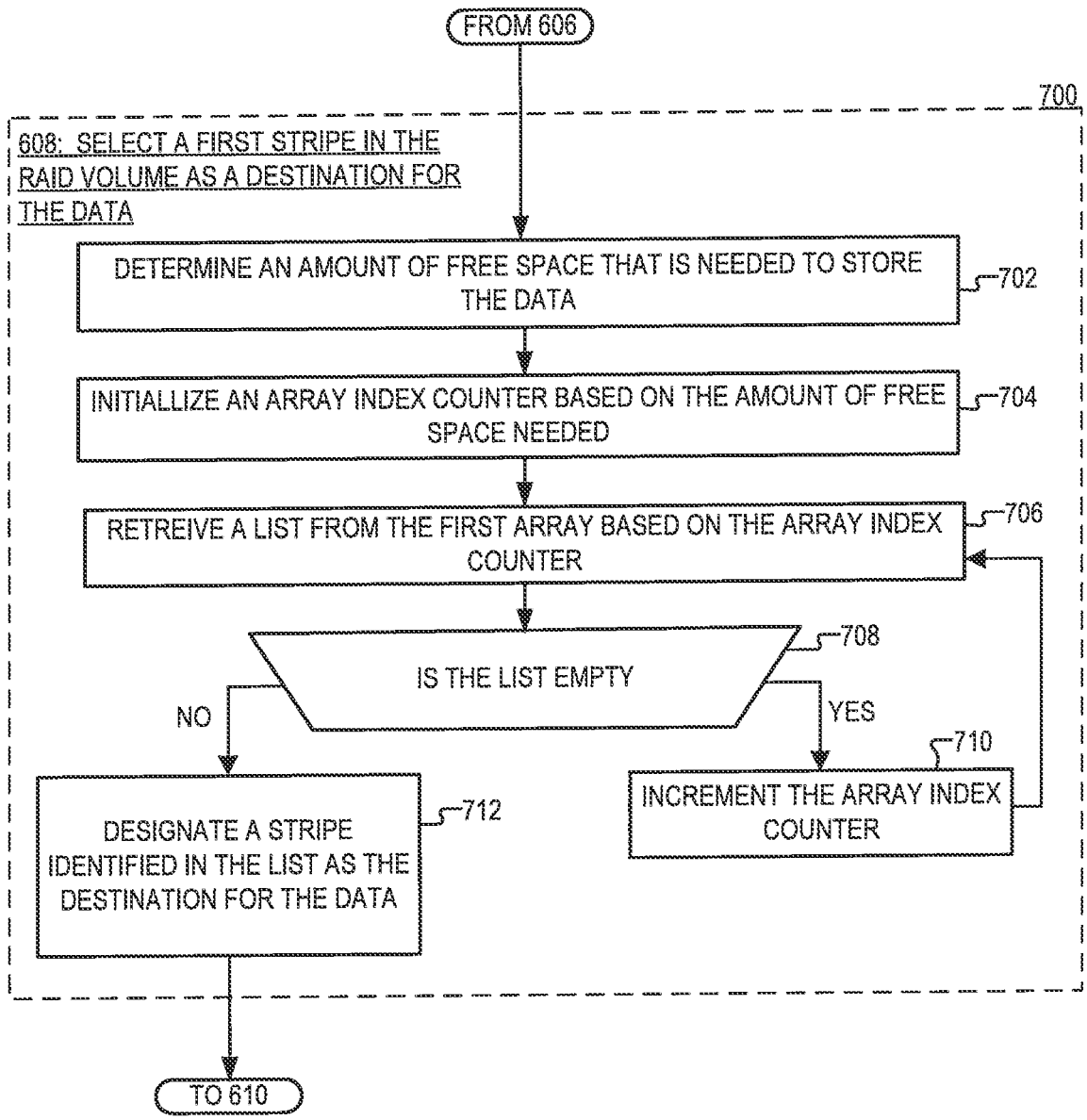
FIG. 7 is a flowchart of an example of a process that is associated with the process of FIG. 6, according to aspects of the disclosure.

FIG. 7 is a flowchart of a process 700 for selecting a first stripe in a RAID volume as the destination for data that that is associated with an instruction to store the data, as specified by step 608 of the process 600. According to the present example, the process 700 is operable to select the fullest one of the plurality of stripes identified by the first array of lists, which still has sufficient capacity to receive the data.

At step 702, an amount of free space is determined that is necessary to store the data. According to the present example, determining the amount of free space that is necessary to store the data includes determining the count of free blocks which a stripe must have in order to be able to receive the data. At step 704, an index in the first array is determined based on the amount of free space identified at step 702. In some implementations, the index may be determined based on the first mapping function associated with the first array of lists. According to the present example, the index is equal to the number of free blocks that are necessary to store the data. After the index is determined, the value of an array counter is set to equal to the value of the determined index. At step 706, a list is retrieved that is located at an index in the first array that is equal to the value of the array index counter. At step 708, a determination is made if the retrieved list is empty. If the list is not empty, the process 700 proceeds to step 710. At step 710 one of the stripes identified in the list is designated as a destination for the data associated with the instruction received at step 602. Otherwise, if the list is not empty, the process 700 proceeds to step 712. At step 712, the array index is incremented. After the array index is incremented, the process 700 returns to step 706 and steps 706 are repeated for the incremented index. According to the present example, the index may be gradually increased until a non-empty list is found which includes an identifier corresponding to a stripe that has sufficient free space to receive the data.

The example of FIG. 7 assumes that a defragmentation process is executed in the background of the storage system, which monitors the availability of stripes from each type, and ensures that at least one empty stripe from each type is present in volume 300. Because the defragmentation process operates in this manner, the process 700 is guaranteed to find at least an empty stripe that can receive the data associated with the instruction to store data. However, in implementations in which the availability of empty stripes is not guaranteed, when the array index counter exceeds the largest index of the first array, a new empty stripe can be dynamically created by changing the block size of another one of the stripes in volume 300.

Figure 8:
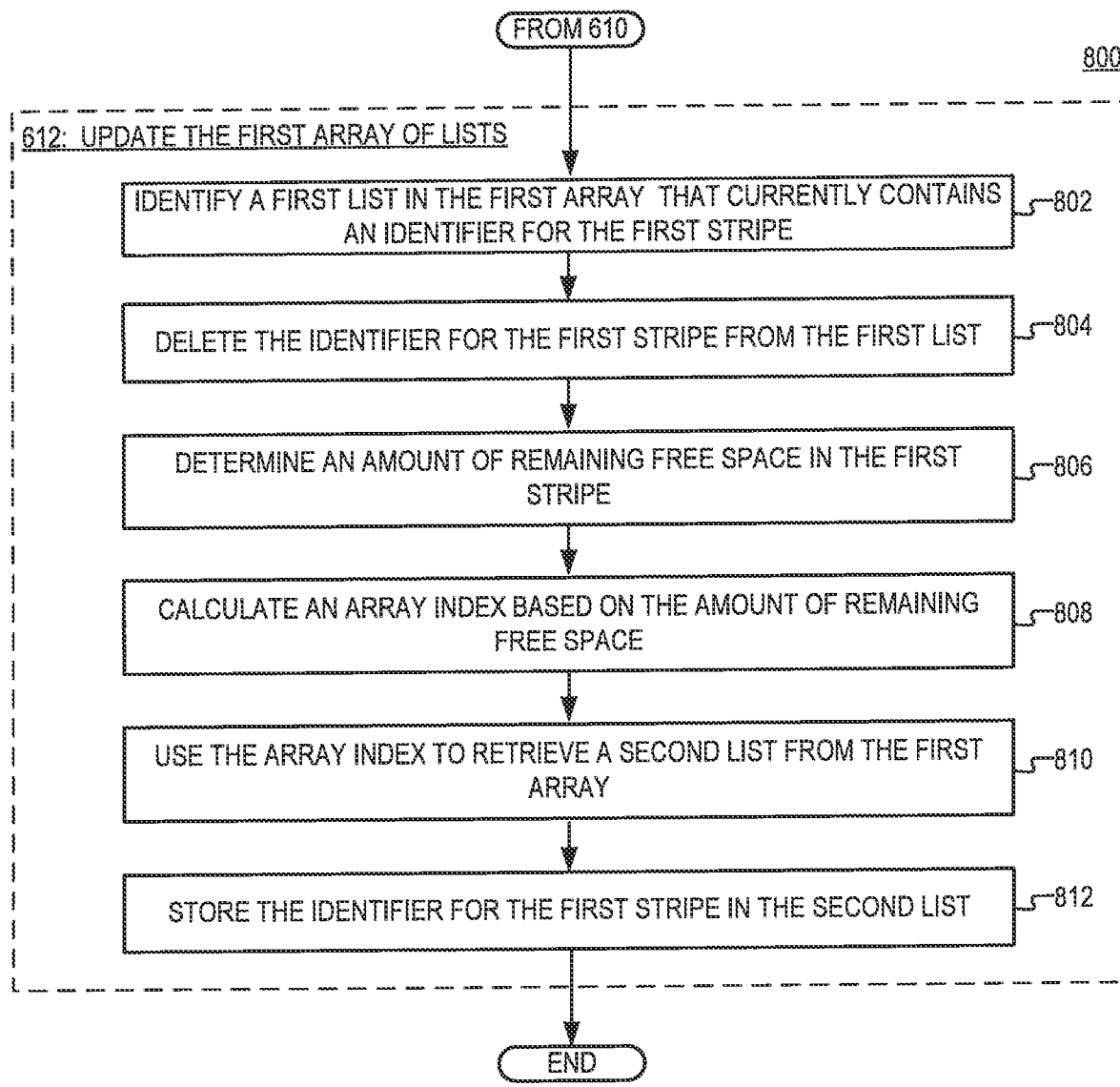
FIG. 8 is a flowchart of an example of a process that is associated with the process of FIG. 6, according to aspects of the disclosure.

FIG. 8 is a flowchart of an example of a process 800 for updating the first array of lists, as specified by step 612 of the process 600. At step 802, a first list in the first array is identified that includes an identifier corresponding to the first stripe. At step 804, the identifier is deleted from the first list. At step 806, an amount of free space is determined that remains available in the first stripe after the data is stored in the first stripe. According to the present example, determining the amount of free space in the first stripe includes determining a count of the blocks in the first stripe that remain free after the data is stored in the first stripe. At step 808, an array index is calculated based on the remaining amount of free space in the first stripe. In some implementations, the array index may be calculated based on the second mapping function associated with the first array. According to the present example, the array index is equal to the count of free blocks in the first stripe that remain after the data is stored. At step 810, a second list is retrieved that is located in the first array at the determined index. At step 812, the identifier of the first stripe is stored in the second list.

Figure 9:
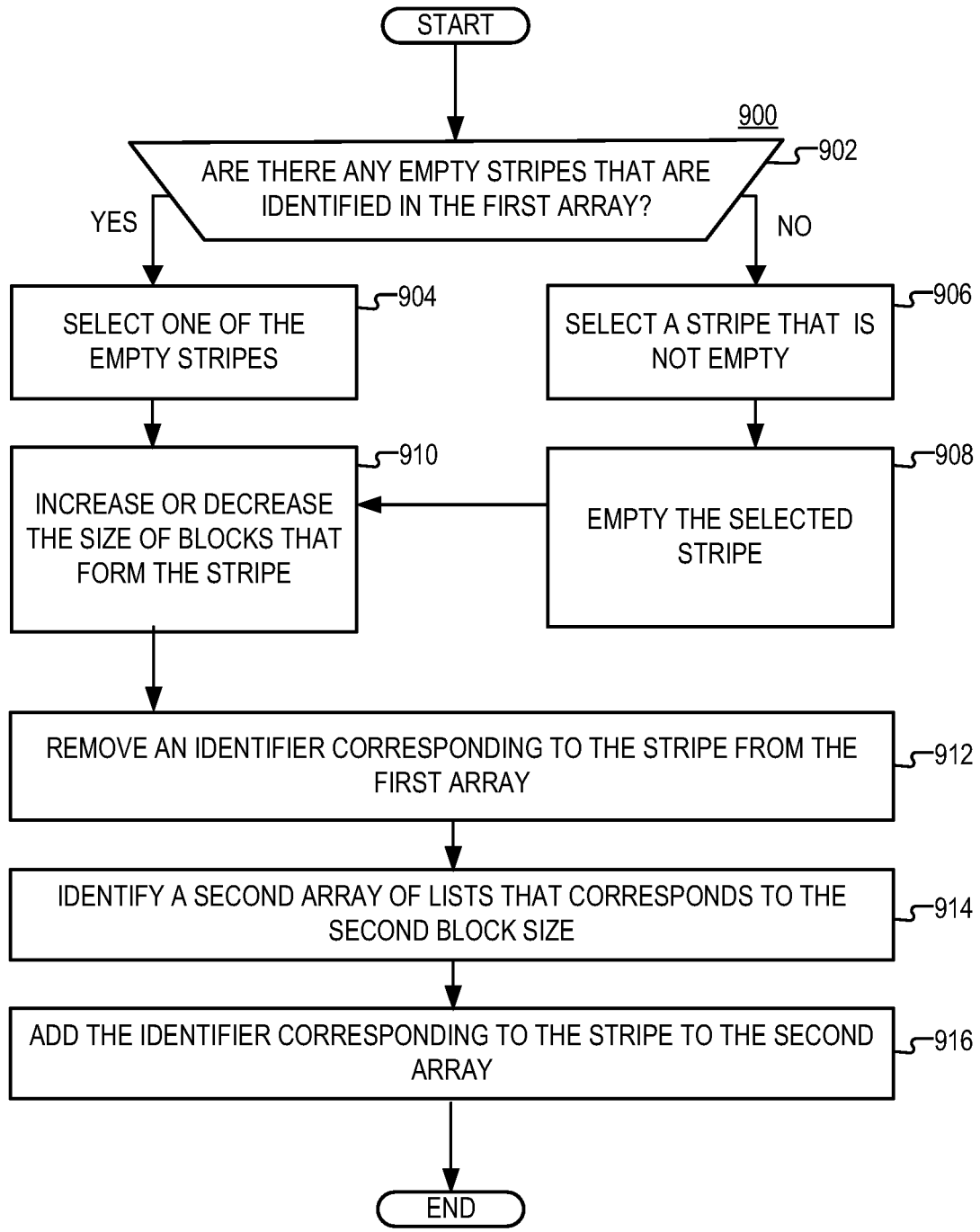
FIG. 9 is a flowchart of an example of a process, according to aspects of the disclosure.

FIG. 9 is a flowchart of an example of a process 900 for changing the block size of a second stripe that is identified in the first array of lists from the first block size to a second block size. In some implementations, the process 900 may be performed by an internal defragmentation component of the storage system executing the process 600, after the process 600 is completed. More particularly, in some implementations, the process 900 may be performed in response to the defragmentation component detecting that the storage system is running low on stripes from a specific type, and/or in response to another trigger.

At step 902, a determination is made if there are any empty stripes that are identified in the first array. If there are empty stripes identified by the first array, the process 900 proceeds to step 904. At step 904, one of the empty stripes is selected. Otherwise, if there are no empty stripes that are identified in the first array, the process proceeds to step 906. At step 906, a non-empty stripe that is identified in the first array is selected. At step 908, the selected non-empty stripe is emptied by copying its contents to one or more stripes that are identified in the first array. In some implementations, after the contents of the non-empty stripe are copied, the indices of the lists in the first array may be updated as discussed above with respect to step 612 and the process 600. At step 910, the type of the (now) empty stripe is changed from a first size to a second size, causing the size of the blocks which form the stripe to increase or decrease. At step 912, an identifier corresponding to the selected stripe is removed from the first array. At step 914, a second array of lists is identified which includes identifiers corresponding to stripes that are formed of blocks having the second size. At step 916, the identifier corresponding to the second stripe is added to the second array. In some implementations, the second array may also have a structure that is the same or similar to that of array 410.

According to aspects of the disclosure, changing the type of a stripe can be very resource intensive when the contents of the stripe need to be copied to other stripes. Copying the contents of the stripe to another stripe necessitates the recalculation of parity bits and other metadata at the stripes that receive the contents, which in turn results in an increased load being placed on the storage system (and the defragmentation process(es) in particular). This increase in load is sometimes referred to as "write amplification," and is known to cause performance degradation in RAID 6 and other similar parity protected storage schemes. By contrast, changing the type of an empty stripe does not require the relocation of data to other stripes, and it does not cause write amplification. For this reason, changing the type of empty stripes can be significantly more efficient than the changing of the type of non-empty ones.

According to aspects of the disclosure, the processes discussed with respect to FIGS. 6-9 maximize the availability of empty stripes in volume 300. As noted above, steps 602-612 and processes 700-800 adopt an approach in which empty stripes are filled last. This approach may reduce the fragmentation in the storage system, thereby ensuring that empty stripes will remain available for defragmentation processes to use for as long as possible. This, in turn, may reduce the load placed on defragmentation processes in the storage system, and improve overall system performance. For this reason, the approach described with steps 602-612 and processes 700-800 is advantageous over destaging processes known in the prior art, which fill empty stripes first.

According to aspects of the disclosure, the processes discussed with respect to FIGS. 6-9 rely on arrays of lists to select the destination stripes for incoming data. As discussed above, under most circumstances, the use of arrays of lists may be advantageous over traditional tree structures because it may increase the speed of discovery of stripes having a desired amount of empty space. In this regard, the utilization of arrays of lists by the storage system may also help improve overall system performance.

Figure 10:
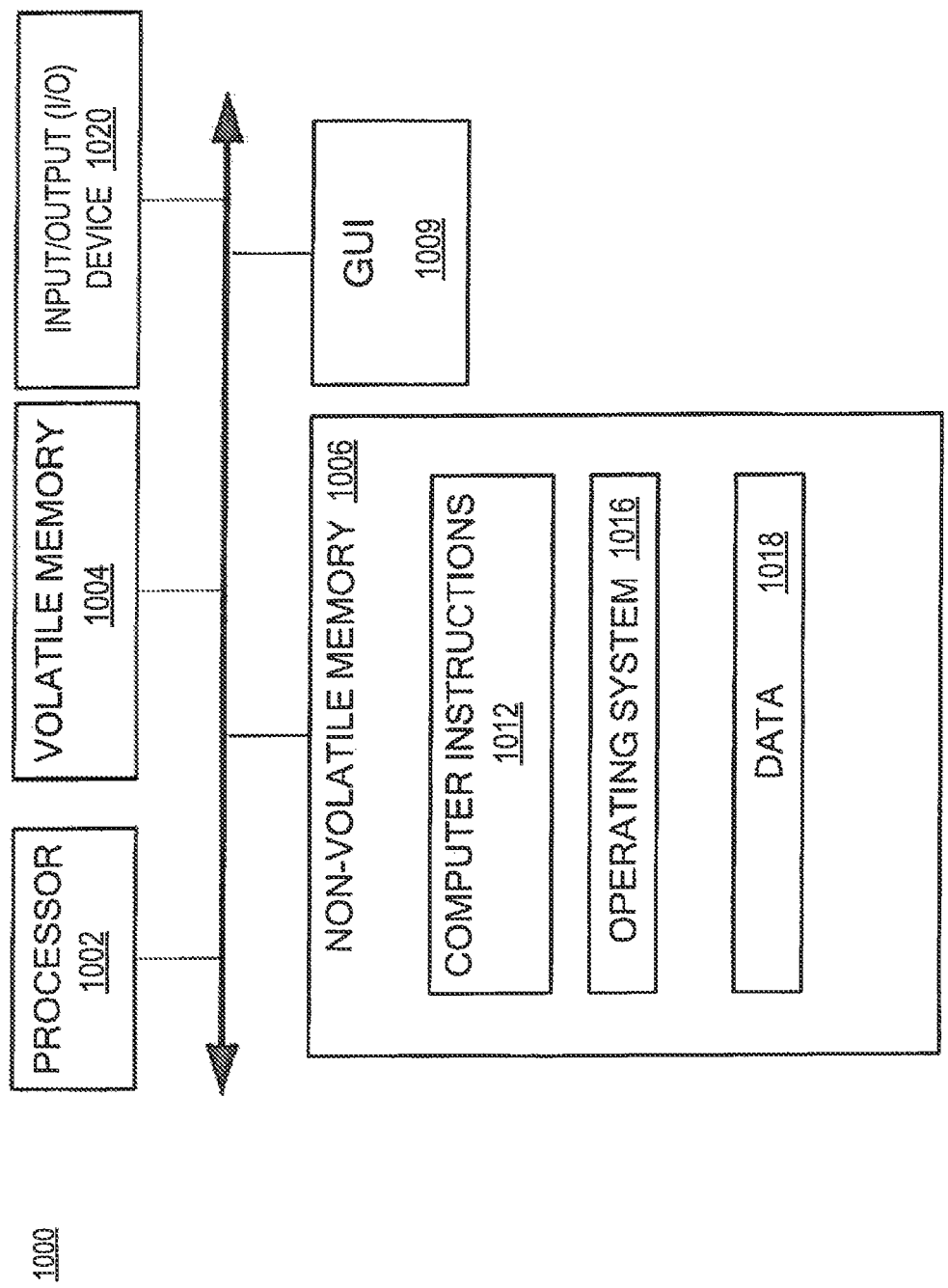
FIG. 10 is a diagram of an example of a computing device, according to aspects of the disclosure.

Referring to FIG. 10, in some embodiments, source site 102 and/or target site 112 may be implemented as one or more computers. Computer 1000 may include processor 1002, volatile memory 1004 (e.g., RAM), non-volatile memory 1006 (e.g., a hard disk drive, a solid state drive such as a flash drive, a hybrid magnetic and solid state drive, etc.), graphical user interface (GUI) 1009 (e.g., a touchscreen, a display, and so forth) and input/output (I/O) device 1020 (e.g., a mouse, a keyboard, etc.). Non-volatile memory 1006 stores computer instructions 1012, an operating system 1016 and data 1018 such that, for example, the computer instructions 1012 are executed by the processor 1002 out of volatile memory 1004 to perform at least a portion of 600-900. Program code may be applied to data entered using an input device of GUI 1009 or received from I/O device 1020.

Processes 600-900 are not limited to use with the hardware and software of FIG. 10 and may find applicability in any computing or processing environment and with any type of machine or set of machines that may be capable of running a computer program. Processes 600-900 may be implemented in hardware, software, or a combination of the two.

The processes described herein are not limited to the specific embodiments described. For example, processes 600-900 are not limited to the specific processing order shown in FIGS. 4 and 5, Rather, any of the blocks of processes 600-900 may be re-ordered, combined or removed, performed in parallel or in serial, as necessary, to achieve the results set forth herein.

Processor 1002 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard-coded into the electronic circuit or soft coded by way of instructions held in a memory device. A "processor" may perform the function, operation, or sequence of operations using digital values or using analog signals. In some embodiments, the "processor" can be embodied in an application specific integrated circuit (ASIC). In some embodiments, the "processor" may be embodied in a microprocessor with associated program memory. In some embodiments, the "processor" may be embodied in a discrete electronic circuit. The "processor" may be analog, digital or mixed-signal. In some embodiments, the "processor" may be one or more physical processors or one or more "virtual" (e.g., remotely located or "cloud") processors.

While illustrative embodiments have been described with respect to processes of circuits, described embodiments may be implemented as a single integrated circuit, a multi-chip module, a single card, or a multi-card circuit pack. Further, as would be apparent to one skilled in the art, various functions of circuit elements may also be implemented as processing blocks in a software program. Such software may be employed in, for example, a digital signal processor, micro-controller, or general purpose computer. Thus, described embodiments may be implemented in hardware, a combination of hardware and software, software, or software in execution by one or more processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid-state memory such as flash memory, hybrid magnetic and solid state memory, non-volatile memory, volatile memory, and so forth, but does not include a transitory signal per se. When embodied in a non-transitory machine-readable medium, and the program code is loaded into and executed by a machine, such as a computer, the machine becomes an apparatus for practicing the method.

When implemented on a processing device, the program code segments combine with the processor to provide a unique device that operates analogously to specific logic circuits. Such processing devices may include, for example, a general purpose microprocessor, a digital signal processor (DSP), a reduced instruction set computer (RISC), a complex instruction set computer (CIBC), an application specific integrated circuit (ASIC), a field programmable gate array (FPGA), a programmable logic array (PLA), a microcontroller, an embedded controller, a multi-core processor, and/or others, including combinations of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

The invention claimed is:

1. A method for storing data in a storage system, the method comprising:
    receiving a request to store data in a RAID volume of the storage system;
    selecting a first block size that is supported by the RAID volume, the RAID volume including a plurality of stripes that are formed of blocks having the first block size; and
    identifying a given one of the plurality of stripes that includes enough free space to accommodate the data and storing the data in the given stripe, the given stripe including a smaller amount of free space than at least some of the stripes in the plurality that have sufficient free space to accommodate the data, the given stripe being identified based on a first array of lists, each of the lists in the first array identifying only stripes that contain the same count of free blocks, and each of the lists in the first array having an index that is based on the count of free blocks contained in the stripes identified by the list, the index being mapped to the count of free blocks by a predetermined mapping function that is associated with the list.

2. The method of claim 1, wherein identifying the given stripe includes identifying a stripe that has less than or equal amount of free space than all other stripes in the plurality that include enough free space to accommodate the data.

3. The method of claim 1, wherein identifying the given stripe includes selecting the given stripe to receive the data over one or more stripes in the plurality that are empty.

4. The method of claim 1, wherein the first array of lists identifies only stripes that have the first block size.

5. The method of claim 1, wherein identifying the given stripe includes:
    detecting an amount of free space needed to store the data;
    calculating an array index based on the amount of free space;
    retrieving a list from the array that is associated with the calculated array index; and
    retrieving, from the list, an identifier corresponding to the given stripe.

6. The method of claim 1, wherein identifying the given stripe includes:
    detecting a count of free blocks that are needed to store the data;
    calculating an array index based on the count;
    retrieving a list from the first array that is associated with the calculated index; and
    retrieving, from the list, an identifier corresponding to the given stripe.

7. A system comprising:
    a memory; and
    at least one or processor operatively coupled to the memory, the at least one processor being configured to:
    receive a request to store data in a RAID volume;
    select a first block size that is supported by the RAID volume, the RAID volume including a plurality of stripes that are formed of blocks having the first block size; and
    identify a given one of the plurality of stripes that includes enough free space to accommodate the data and storing the data in the given stripe, the given stripe including a smaller amount of free space than at least some of the stripes in the plurality that have sufficient free space to accommodate the data, the given stripe being identified based on a first array of lists, each of the lists in the first array identifying only stripes that contain the same count of free blocks, and each of the lists in the first array having an index that is based on the count of free blocks contained in the stripes identified by the list, the index being mapped to the count of free blocks by a predetermined mapping function that is associated with the list.

8. The system of claim 7, wherein identifying the given stripe includes identifying a stripe that has less than or equal amount of free space than all other stripes in the plurality that include enough free space to accommodate the data.

9. The system of claim 7, wherein identifying the given stripe includes selecting the given stripe to receive the data over one or more stripes in the plurality that are empty.

10. The system of claim 7, wherein the first array of lists identifies only stripes that have the first block size.

11. The system of claim 7, wherein identifying the given stripe includes:
   detecting an amount of free space needed to store the data;
   calculating an array index based on the amount of free space;
   retrieving a list from the array that is associated with the calculated array index; and
   retrieving, from the list, an identifier corresponding to the given stripe.

12. The system of claim 7, wherein identifying the given stripe includes:
   detecting a count of free blocks that are needed to store the data;
   calculating an array index based on the count;
   retrieving a list from the first array that is associated with the calculated index; and
   retrieving, from the list, an identifier corresponding to the given stripe.

13. A non-transitory computer-readable medium storing one or more processor-executable instructions which, when executed by at least one processor, cause the at least one processor to perform the operations of:
   receiving a request to store data in a RAID volume;
   selecting a first block size that is supported by the RAID volume, the RAID volume including a plurality of stripes that are formed of blocks having the first block size; and
   identifying a given one of the plurality of stripes that includes enough free space to accommodate the data and storing the data in the given stripe, the given stripe including a smaller amount of free space than at least some of the stripes in the plurality that have sufficient free space to accommodate the data, the given stripe being identified based on a first array of lists, each of the lists in the first array identifying only stripes that contain the same count of free blocks, and each of the lists in the first array having an index that is based on the count of free blocks contained in the stripes identified by the list, the index being mapped to the count of free blocks by a predetermined mapping function that is associated with the list.

14. The non-transitory computer-readable medium of claim 13, wherein identifying the given stripe includes identifying a stripe that has less than or equal amount of free space than all other stripes in the plurality that include enough free space to accommodate the data.

15. The non-transitory computer-readable medium of claim 13, wherein identifying the given stripe includes selecting the given stripe to receive the data over one or more stripes in the plurality that are empty.

16. The non-transitory computer-readable medium of claim 13, wherein the first array of lists identifies only stripes that have the first block size.

17. The non-transitory computer-readable medium of claim 13, wherein identifying the given stripe includes:
   detecting an amount of free space needed to store the data;
   calculating an array index based on the amount of free space;
   retrieving a list from the array that is associated with the calculated array index; and
   retrieving, from the list, an identifier corresponding to the given stripe.

18. The non-transitory computer-readable medium of claim 13, wherein identifying the given stripe includes:
   detecting a count of free blocks that are needed to store the data;
   calculating an array index based on the count;
   retrieving a list from the first array that is associated with the calculated index; and
   retrieving, from the list, an identifier corresponding to the given stripe.

* * * * *